(12) United States Patent
Terfloth et al.

(10) Patent No.: US 9,321,244 B2
(45) Date of Patent: Apr. 26, 2016

(54) ADHESIVE BONDING METHOD AND PRODUCTS PRODUCED THEREBY

(71) Applicant: Jowat AG, Detmold (DE)

(72) Inventors: Christian Terfloth, Detmold (DE); Dieter Guse, Lohne (DE); Felix Starck, Detmold (DE)

(73) Assignee: JOWAT AG, Detmold (DE)

( * ) Notice: Subject to any disclaimer, the term of this patent is extended or adjusted under 35 U.S.C. 154(b) by 226 days.

(21) Appl. No.: 13/864,646

(22) Filed: Apr. 17, 2013

(65) Prior Publication Data

US 2013/0280496 A1    Oct. 24, 2013

(51) Int. Cl.
| | | |
|---|---|---|
| *B32B 7/12* | (2006.01) | |
| *C09J 5/02* | (2006.01) | |
| *B32B 37/00* | (2006.01) | |
| *C09J 7/02* | (2006.01) | |

(52) U.S. Cl.
CPC ............... *B32B 7/12* (2013.01); *B32B 37/0076* (2013.01); *C09J 5/02* (2013.01); *C09J 7/0203* (2013.01); *C09J 2205/31* (2013.01); *Y10T 428/24777* (2015.01); *Y10T 428/2826* (2015.01)

(58) Field of Classification Search
CPC ........ C09J 7/0203; B32B 7/12; A47B 96/201
See application file for complete search history.

(56) References Cited

U.S. PATENT DOCUMENTS

| | | | |
|---|---|---|---|
| 6,489,392 B1 * | 12/2002 | Lappalainen et al. | 524/555 |
| 2007/0243359 A1 * | 10/2007 | Petersen et al. | 428/147 |
| 2008/0004363 A1 * | 1/2008 | Rosenberger | 522/2 |
| 2008/0008885 A1 * | 1/2008 | Terfloth et al. | 428/411.1 |
| 2008/0190541 A1 * | 8/2008 | Terfloth et al. | 156/60 |
| 2010/0227128 A1 * | 9/2010 | Kramer et al. | 428/195.1 |
| 2011/0183122 A1 * | 7/2011 | Schumacher | 428/192 |

FOREIGN PATENT DOCUMENTS

| | | | |
|---|---|---|---|
| DE | 102008003747 A1 * | 6/2009 | |
| WO | WO 9906209 A1 * | 6/1998 | |

OTHER PUBLICATIONS

Translation of de102008003747 Retrieved on Jun. 24, 2015.*
WO 1999006209 Retrieved Jun. 24, 2015.*

* cited by examiner

*Primary Examiner* — Bruce H Hess
*Assistant Examiner* — Christopher Polley
(74) *Attorney, Agent, or Firm* — Edward E. Sowers; Brannon Sowers & Cracraft PC

(57) ABSTRACT

The invention relates to a method for mounting an edge, more particularly plastics edge, onto a material, and also to the products obtained in this way, and to the use thereof.

11 Claims, No Drawings

ADHESIVE BONDING METHOD AND PRODUCTS PRODUCED THEREBY

CROSS-REFERENCES TO RELATED APPLICATIONS

This present application claims priority to German Applications No. DE 10 2012 007 788.2 filed Apr. 20, 2012, and DE 10 2012 008 401.3 filed Apr. 27, 2012, and incorporates all by reference herein, in their entirety.

BACKGROUND OF THE INVENTION

The present invention relates to the technical field of plastics and adhesives technology, more particularly the adhesive bonding of edges, more particularly plastics edges or edge bands.

The present invention relates more particularly to a method for applying edges, more particularly plastics edges, to materials, and also to the products produced in this way, and to the use thereof.

The present invention further relates to a method for applying adhesive layers which can be activated by means of laser radiation to edges, more particularly to edge bands. The present invention likewise relates, moreover, to edge bands which can be provided on at least one side with an adhesive layer which can be activated by means of laser radiation.

Lastly, the present invention relates to the inventive use of a composition for equipping an edge band with an adhesive layer.

In the prior art there are a multitude of methods known for mounting edge bands onto the narrow faces of in particular panel-like workpieces.

Typically, in the prior art, edge bands are mounted onto the narrow faces of panel-like workpieces in through-travel machines, such as, for example, edge-processing machines, with the aid of edge gluing assemblies. In this case provision is generally made for the narrow face of the workpiece to be furnished, immediately prior to the placement of the edge band, with a hot-melt adhesive, more particularly with so-called "hotmelts".

The mounting of the edge bands in through-travel machines, with application of hot-melt adhesive immediately prior to the placement of the edge band, is a cost-effective method which is also suitable for producing relatively large numbers of units. Nevertheless, this method harbours a multiplicity of disadvantages.

For instance, the melting of the hot-melt adhesive is energy-consuming and leads overall to an increase in the operating costs; a time of up to half an hour, for example, elapses before an operating temperature of 150 to 210° C. is attained. Furthermore, energy is needed to head the glue container in order to maintain the adhesive in the liquid or application-ready state throughout the production process. Adhesive application takes place usually by means of spraying, jetting, rolling or knife coating onto the workpiece.

Moreover, the above-described method requires relatively large amounts of the adhesive. As a consequence, after solidification, the adhesive joint becomes more susceptible to penetration by dirt and moisture, and so, over the course of time, on the one hand the adhesive bond may become undone, and on the other hand the adhesive edge is often unsatisfactory from an aesthetic standpoint.

In addition, the use of the adhesive in such large amounts leads to swelling of adhesive out of the bonded joint during subsequent pressing of the edge band onto the workpiece, and such swelling results in instances of fouling both of the workpiece and of the processing machine. To prevent this, the workpiece must be treated with release agents—a costly and inconvenient procedure—before the method is commenced.

Moreover, it is possible in this way to process only those hot-melt adhesives that have relatively low molecular weights and relatively high melt indices, which, however, do not always lead to the desired bonding qualities.

Because of the disadvantages of this method, as set out above, a search has been ongoing for some considerable time into alternative possibilities for the mounting of edge bands onto narrow faces of panel-like workpieces.

Other prior-art methods attempt to avoid these disadvantages through provision of edge bands already coated with adhesive, which allow subsequent mounting onto the narrow face at any desired point in time following the application of adhesive.

In order to produce edge bands already coated with adhesive, there are a variety of methods known in the prior art. While such methods do lead to an improvement in relation to the disadvantages identified above, and do allow, in particular, a more flexible regime, they are nevertheless unsatisfactory in a host of respects.

One way of producing precoated edge bands is by coextrusion. In that case, thermoplastic edge bands are produced in what are called inline processes, with a subsequently activatable plastics layer or adhesive layer—in other words the production of the edge band on the one hand and its furnishing with plastics or adhesive on the other take place, as it were, simultaneously. By means of coextrusion it is also possible to process polymers having a particularly high molecular weight, thus leading to particularly stable adhesive bonds. Nevertheless, this method is hampered by numerous disadvantages.

Coextrusion methods necessitate particularly high levels of investment in relation to the production line, since said line must always be adapted individually to the particular process. This technology is therefore economical only for large production runs and batches; the production of individual embodiments which are not sold in large volumes, in particular, often makes no sense from the economic standpoint.

Furthermore, such methods also carry numerous disadvantages in a technical respect. The reason is that, with coextrusion methods, the direct joining of thermoplastic edge tape and plastics layer or adhesive layer has to take place without the use of an adhesion promoter. In the absence of the adhesion promoter layer, consequently, sufficient adhesion can be achieved only between materials of the same kind. In addition, the use of, for example, resin-impregnated paper edges or veneer edges as an edge band is not possible, since only thermoplastic materials are extrudable.

All in all, therefore, there is only a very limited selection of materials, or limited selection of combinations of materials, that can be used for producing precoated edge bands.

As well as the production of coated edge bands by coextrusion, it is also possible to coat edge bands with a hot-melt adhesive, or hot melt, as part of offline processes. In the case of these methods, the edge band per se is produced first of all, and only later on, by a toll coater or a manufacturer of furniture parts, for example, is it coated with a subsequently activatable adhesive. All in all, such offline processes offer good flexibility in relation to the edge materials that are to be coated, and, by virtue of the cost-effective regime, allow the furnishing of small batches and production runs as well: as is the case for the coated edge bands produced by coextrusion, the activation or ultimate bonding of the edge, more particularly plastics edge, to the respective materials component may take place at any desired period following completion of the coated edge band. Nevertheless, even methods of this kind are associated with serious disadvantages. A particular problem is that the use of polymers with high molecular weights and low melt indices is not possible, since the high temperatures that this requires cannot be achieved in offline operation. Though it is possible to coat the edge bands much more cost-effectively in such offline processes, the resultant adhesive bonds are nevertheless inferior in terms of service properties to the edge bands produced by coextrusion, and are comparable merely with the conventional edge gluing using thermoplastic hot melts, as has been described above.

The melting of the adhesive layer, both of edge bands produced by coextrusion and of aftercoated edge bands, for the subsequent mounting of the edge band onto a material, is normally accomplished by means of hot air or of infrared, UV, laser, plasma or microwave radiation. In such cases, however, the transfer of energy to the adhesive is often only weakly pronounced or poorly controllable, and so the heating is relatively lengthy or unspecific. Furthermore, in view in particular of the poor controllability, the edge band itself is frequently heated as well. This, however, is detrimental to the quality of the edge band, since heating of the edge band can lead to physical damage, resulting in turn in the edge band materials being restricted to those that lack sensitivity.

For example, EP 1 163 864 A1 describes furniture panels and a method for producing them, with provision being made for a thermoplastics edge produced by coextrusion and having layers of different hardnesses to be melted by means of hot air or laser radiation and mounted onto the furniture panel, comprising a wood-based material. As already described above, however, the use of coextrusion for producing coated edge bands has a multitude of disadvantages. In the absence of an adhesive layer based on high molecular mass polymers, moreover, the stability and quality of the adhesive bond produced in this way are unsatisfactory.

Moreover, DE 10 2006 021 171 A1 describes cover strips based on thermoplastics that are likewise produced by coextrusion and as part of their production process are provided with a hot-melt adhesive layer which can be activated by laser radiation. This method as well is associated with the above-described general disadvantages of coextrusion methods.

WO 2009/026977 A1 describes edge strips for furniture items that have a melting layer which can be activated with supply of energy, the coated edge strip being produced by coextrusion. The resultant adhesive joints, however, have a relatively high thickness of up to 1.5 mm, and this—as likewise described above—on the one hand is unwanted, in view of aesthetic considerations, and on the other hand may lead to more rapid soiling and/or parting of the adhesive layer. In particular, the relatively thick adhesive layer means that it is impossible to achieve targeted and efficient reactivation of the adhesive.

BRIEF SUMMARY OF THE INVENTION

Against this background, therefore, it is an object of the present invention to provide a method for mounting edge bands that is able at least largely to avoid the above-outlined disadvantages of the prior art, or else at least to attenuate them.

More particularly it is viewed as an object of the present invention to provide a method for mounting edges, more particularly plastics edges, onto workpieces, said method possessing the flexibility of aftercoating methods (offline processes), but allowing the production of more high-grade adhesive bonds.

As a solution to the problem outlined above, the present invention—in accordance with a first aspect of the present invention—proposes a method for mounting an edge, more particularly plastics edge, onto a material according to Claim 1; other embodiments, in particular advantageous embodiments, of the method of the invention are subject matter of the relevant dependent claims.

Furthermore, in accordance with a second aspect of the present invention, the present invention relates to a material obtainable by the method of the invention, in accordance with the relevant independent claims.

Furthermore, in accordance with a third aspect of the present invention, the present invention relates to the use of a material of the invention for producing furniture, in accordance with the relevant independent claim.

Moreover, in accordance with a fourth aspect of the present invention, the present invention relates to a method for applying an adhesive layer (plastics layer) which can be activated by means of laser radiation (laser-activatable layer) to at least one side of an edge band (edge strip), in accordance with the relevant independent claim.

The present invention further relates—in accordance with a fifth aspect of the present invention—to an edge band or edge strip in accordance with the relevant independent claims.

Lastly, the present invention—in accordance with a sixth aspect of the present invention—relates to the use of a composition which comprises at least one adhesive polymer and at least one laser radiation-absorbing additive, in accordance with the relevant independent claim.

It will be appreciated that embodiments, designs, advantages and the like which are given below, for purposes of avoiding repetition, only in relation to one aspect of the invention also of course apply in respect of the other aspects of the invention, correspondingly.

Furthermore it is self evident that with regard to value figures, number figures and range figures below, the stated values and ranges should not be understood as imposing any restriction; for the skilled person it is understood that in certain cases, or for certain applications, it is possible to deviate from the stated ranges and figures, without departing from the scope of the present invention.

It is also the case that all of the values and parameter figures or the like that are stated below may in principle be ascertained or determined using standardized or explicitly stated determination methods or else by techniques for determination that are familiar per se to the skilled person.

Subject to what has been said above, the present invention is described in more detail below.

DETAILED DESCRIPTION OF THE INVENTION

The present invention accordingly provides—in accordance with a first aspect of the present invention—a method for mounting an edge, more particularly plastics edge, onto a workpiece, more particularly a method for mounting an edge band (edge strip) onto at least one narrow face (narrow side) of an in particular panel-like materials component (workpiece), by means of jointing and/or by means of adhesive bonding, wherein (a) first of all the edge band is furnished and/or provided, on its side to be joined to the material, more particularly materials component, with an adhesive layer (plastics layer) which can be activated by means of laser radiation (laser-activatable layer), the adhesive layer which can be activated by means of laser radiation being obtained starting from a dispersion or solution of at least one adhesive polymer to which at least one laser radiation-absorbing additive (laser additive), more particular pigment, is added, and (b) thereafter, the edge band furnished and/or provided in this way with the adhesive layer which can be activated by means of laser radiation is mounted, with exposure to laser radiation, onto at least one narrow face of the materials component, being more particularly joined and/or adhesively bonded durably to at least one narrow face of the materials component.

In an entirely surprising way, indeed, the applicant has found that the above-described problems of the prior art can be solved in an impressive way by aftercoating of the edge bands starting from dispersions or solutions of the adhesive polymers, on the one hand, and by using laser radiation-absorbing additives to activate the adhesive layer by means of exposure to laser radiation, on the other hand.

As described above, the mounting of the edge, more particularly plastics edge, or of the edge band onto the material takes place, in the context of the method of the invention, by means of jointing or adhesive bonding. The term "jointing or adhesive bonding" refers in the context of the present invention particularly to those techniques which enable the holding together of hitherto separate workpieces, (in the present case: edge or edge band on the one hand and material on the other), resulting in turn in a new workpiece with an altered geometric form (in the present case: material with mounted edge or edge band). In accordance with the invention, in particular, the term "jointing" refers to fusional joining methods, more particularly adhesive bonding methods.

As also described above, in the context of the method of the invention, the edge, more particularly plastics edge, or the edge band is equipped with an adhesive layer which is laser-activated or can be activated by means of laser radiation. For the purposes of the present invention, an adhesive layer which is laser-activatable or activatable by means of laser radiation is a layer which is made of or includes at least one adhesive (polymer) and which, through absorption of energy emitted by means of laser radiation, with subsequent conversion of the absorbed energy into thermal energy, can be melted or (re)activated. As a result of conversion of the absorbed energy into thermal energy, the adhesive layer is heated generally to temperatures above its softening point or melting point or melting range, and so is placed in an adhesive or tacky state. Advantageously, the activation or heating of the adhesive layer takes place immediately before and/or during the jointing or adhesive bonding, so that adhesive layer and edge band are not exposed disproportionately to thermal stress.

The terms "laser" and "laser radiation" refer in the context of the present invention in particular to light amplification by stimulated emission of radiation, with the amplification being achieved through a laser medium, which may be present in the form of a solid, semiconductor, gas or liquid. The wavelengths of laser radiation are extremely variable and span a spectrum from microwave radiation through to X-rays. When laser radiation is used as part of jointing or adhesive bonding methods, the laser radiation is usually applied, with focusing by a laser medium, onto the surface where jointing or adhesive bonding is to take place, thus leading to a high energy concentration in that region. Through absorption and conversion of the energy, introduced by laser, by means of laser-activatable additives, a sharp rise in temperature, even beyond the softening temperature of the adhesive, is achieved at the surface of the adhesive layer, and so—as already mentioned—the adhesive undergoes transition to an adhesive or adhesion—or bonding-amenable state.

In other words, therefore, the term "laser activation" is to be understood in the context of the present invention to mean in particular that the adhesive layer and the adhesive-activatable additives of the adhesive layer are capable of absorbing the energy which is released on exposure of the adhesive layer to laser radiation and of converting that energy into thermal energy in order thus to allow bonding to the material.

The method of the invention possesses a series of advantages and special features that distinguish it from the methods of the prior art:

In the context of the present invention, a method is realized for the first time that allows the production of high-quality adhesive bonds, of the kind usually achievable only by coextrusion methods, in aftercoating methods, more particularly offline processes, that are technically simpler than coextrusion and hence are also more cost-effective.

The method of the invention is cost-effective in particular in that the cost and complexity of apparatus and/or the adaptation required to apparatus is much less than for the coextrusion methods known from the prior art. It is therefore profitable to employ the method of the invention even in the case of relatively small production runs and batches, whereas coextrusion makes economic sense only when deployed on an industrial scale with high numbers of units.

It is also possible, furthermore, because of the envisaged separation of the steps of coating with the adhesive layer, on the one hand, and jointing method, on the other, to carry out individual adaptation of edge band, material and adhesive. This is often relevant in relation to decoration and the optical design of the end products.

Furthermore, the aftercoating of the edge bands in accordance with the invention, starting from dispersions or solutions, allows use of polymers with a high molecular weight, on the one hand, and a low melt index, on the other. Polymers of these kinds lead to more stable adhesive bonds than the hot melts used to date, but to date have only been able to be processed as part of coextrusion, which is costly, technically complicated, and less flexible.

Moreover, the application of the adhesive polymer starting from dispersions or solutions, in particular, also allows the use of particularly low quantities of adhesive, and allows homogeneous application (by spraying, jetting, knife coating, rolling, etc., for example), and this is advantageous in a variety of respects: in this way it is possible to prevent the adhesive swelling out of the bondline and necessitating costly and inconvenient pretreatment and/or aftertreatment of the workpiece and/or cleaning of the machine. Furthermore, as a result of the low level of adhesive used, it is also possible to obtain thinner bond lines, of the kind also referred to as "invisible joints", being invisible to the naked eye.

Furthermore, as a result of the application of dispersion or solution, the distribution of laser-activatable additives, more particularly pigments, that is achieved is extremely uniform, having the effect, in turn, of outstanding controllability of the heating, with the consequence that it is exclusively the adhesive layer, but not the edge tape, which becomes heated. Furthermore, the homogeneous distribution of the additives in the adhesive layer has the effect that bonding takes place over the full area—in other words, no regions result which are bonded only more weakly or even, possibly, not at all. Incomplete bonding, in contrast, would adversely affect the stability of the adhesive bond.

The advantages set out above can be attributed in particular to the inventive combination of the application of the adhesive polymers from dispersions or solutions as part of the aftercoating of the edge band, on the one hand, and to the use of laser-activatable additives, more particularly pigments, on the other hand, in conjunction with the other measures according to the invention.

In connection with the above-described advantages and special features, reference is also made even at this point to the working examples which have been carried out by the applicant and which demonstrate the aforementioned effects in an impressive way, and which are also described in detail below.

The present invention can be embodied in a wide variety of ways, with preferred embodiments being described comprehensively below in order to aid understanding.

Generally speaking, when carrying out the method of the invention, the edge used, more particularly edge band, may be an edge band comprising a thermoplastic or thermoset material or comprising wood or comprising paper or cardboard or comprising metals, more particularly an edge band comprising a thermoplastic or thermoset material, preferably an edge band comprising a thermoplastic material.

Materials which have been found to be especially suitable in accordance with the invention for use as the plastics edge, more particularly edge band, include (i) polyolefins, preferably polyethylene (PE) or polypropylene (PP); (ii) polymethacrylates (PMA); (iii) polymethylmethacrylates (PMMA); (iv) polyvinyl chloride (PVC); (v) polyvinylidene halide, more particularly polyvinylidene fluoride (PVDF) or polyvinylidene chloride (PVDC); (vi) acrylonitrile/butadiene/styrene copolymer (ABS); (vii) polyamides (PA), polycarbonates (PC); (viii) melamine-formaldehyde resins; (ix) epoxy resins; (x) phenolic resins; or (xi) urea resins.

It is considered particularly advantageous that by means of the method of the invention, more particularly on the basis of the application of polymer from dispersion or solution and the activation by means of laser radiation, which is gentle to the material, the selection of materials used for providing the edges, more particularly plastics edges, or edge bands is significantly more diverse. In the context of the present invention, and in contrast to coextrusion methods, it is also possible to use edge bands based on wood, metals, e.g. aluminium, paper or cardboard.

As far as the material per se is concerned, provision is usually made in accordance with the invention for use to be made as the material, more particularly as panel-like materials component, of wood, wood substitutes, plastics, metals or glass, preferably wood or wood substitutes.

Wood substitutes for the purposes of the method of the invention include, in particular, wood fibre materials. Wood fibre materials are usually materials of the kind comprising wood fibres as a constituent, such as, for example, chipboard, MDF (Medium Density Fibre Board) or OSB (Oriented Strand-Board) panels. Provision may also be made, however, to use wood substitutes based on plastics, in which the plastics contemplated include all of those referred to in connection with the edge bands.

To prepare the surface of the edge for the adhesive or adhesive layer, more particularly for the purpose of increasing the adhesion, it is preferred in accordance with the invention if the edge, more particularly the edge band, before being furnished with the dispersion or solution of the adhesive polymer, is provided and/or coated with an adhesion promoter (primer). Alternatively, however, instead, provision may be made for the edge, more particularly plastics edge, to be subjected to a surface treatment and/or surface activation, preferably by means of corona treatment or plasma treatment.

The surface of the edge, more particularly plastics edge, can therefore be prepared for the adhesive through the use of two different alternative methods (i.e. adhesion promoter application or pretreatment), particularly for the purpose of improving the affinity of the adhesive for the edge or edge band.

With regard to the adhesion promoter per se, it is preferably selected from the group of polymer solutions or polymer dispersions, more particularly solvent-containing or, preferably, aqueous polymer dispersions, preferably polyurethane (PU) dispersion adhesives. According to one particularly preferred embodiment, it is equally possible as adhesion promoters to use preferably aqueous polymer dispersions which are selected in particular from the group of polyurethane dispersions, acrylate dispersions, chloroprene dispersions, epoxy resin dispersions, ethylene-vinyl acetate dispersions (EVA dispersions) and polyvinyl acetate dispersions (PVAc dispersions), and also mixtures of two or more of the aforementioned dispersions. With particular preference the adhesion promoter used as part of the method of the invention is an aqueous polymer dispersion based on a polyurethane dispersion which in particular is on an aqueous basis.

As far as the dispersion or solution of the adhesive polymer that is used in method step (a) is concerned, it may be configured in a variety of ways.

Hence it is possible, in the context of the method of the invention, for the dispersion or solution of the adhesive polymer that is used in method step (a) to be formed on an aqueous basis or organic basis, preferably an aqueous basis.

The application of the adhesive polymers starting from solutions or dispersions makes it possible for the first time to produce high-quality adhesive bonds, of the kind usually achieved in the prior art exclusively by means of coextrusion, and to do so often also as part of aftercoatings, especially offline processes, since such application also allows the use of polymers which can otherwise be processed only by means of coextrusion, more particularly polymers having high molecular weights and/or low melt indices.

With regard to the adhesive polymer per se, it is preferably selected from homopolymers and copolymers. More particularly the adhesive polymer is selected from the group of (i) poly-urethanes; (ii) polyacrylates and polymethacrylates; (iii) ethylene-vinyl acetates; (iv) polyvinyl acetates, and also mixtures and combinations thereof.

In accordance with one particularly preferred embodiment of the present invention, provision may be made for the adhesive polymer to have an average molecular weight, more particularly weight-average molecular weight (Mw), of at least 70 000 g/mol, more particularly at least 85 000 g/mol, preferably at least 100 000 g/mol.

Provision may be made in particular for the adhesive polymer to have an average molecular weight, more particularly weight-average molecular weight (Mw), in the range from 70 000 g/mol to 10 000 000 g/mol, more particularly in the range from 85 000 g/mol to 5 000 000 g/mol, preferably in the range from 100 000 g/mol to 3 000 000 g/mol, more preferably in the range from 150 000 g/mol to 2 000 000 g/mol, very preferably in the range from 175 000 g/mol to 1 500 000 g/mol, especially preferably in the range from 200 000 g/mol to 1 000 000 g/mol.

In particular, in accordance with one preferred embodiment of the present invention, provision may also be made for the adhesive polymer, at a temperature of 190° C. under a load of 2.16 kg, to have a melt index (i.e. also referred to synonymously as melt flow index or melt flow rate or MFR), determined more particularly in accordance with ISO 1133, of not more than 50 g/10 min, more particularly not more than 30 g/10 min, preferably not more than 25 g/10 min. In this context it is especially preferred for the adhesive polymer, at a temperature of 190° C. under a load of 2.16 kg, to have a melt index, determined more particularly in accordance with ISO 1133, in the range from 0.01 g/10 min to 50 g/10 min, more particularly in the range from 0.1 g/10 min to 30 g/10 min, preferably in the range from 0.2 g/10 min to 25 g/10 min, more preferably in the range from 0.3 g/10 min to 20 g/10 min.

The melt index (also referred to synonymously as melt flow index or melt flow rate or MFR) is used in particular for characterizing the flow behaviour of thermoplastics under defined pressure and temperature conditions. This parameter is used especially as a measure of the viscosity of the plastics melt or adhesive melt. According to ISO 1133: 2005, the melt index is determined in particular by means of capillary rheometers.

Through the use of adhesive polymers having the aforementioned molecular weights on the one hand and/or having a melt index within the above-described range on the other hand, it is possible to achieve particularly stable and high-grade adhesive bonds in relation to the mounting of edge bands onto materials components. The processing of such polymers was hitherto possible exclusively as part of costly and technically complex coextrusion methods. In the aftercoating and offline processes that are advantageous economically and technically, it was hitherto generally possible only to use hot-melt adhesives based on polymers with relatively low molecular weights and relatively high melt indices, resulting, however, in much poorer adhesive properties. The use of such polymers in aftercoating methods as well (especially in offline processes as well) has therefore been successfully achieved for the first time in the context of the method of the invention, in particular by virtue of the application of the polymers starting from dispersions or solutions, which is realized in an entirely surprising way.

As far as the amount of adhesive polymer used is concerned, this amount may vary within wide ranges: in the context of the present invention, it is preferred for the dispersion or solution used in method step (a) to comprise the adhesive polymer in an amount in the range from 5 to 90 wt. %, more particularly 10 to 80 wt. %, preferably 15 to 70 wt. %, more preferably 17.5 to 65 wt. %, very preferably 20 to 60 wt. %, especially preferably 25 to 55 wt. %, based on the dispersion or solution.

In order to enable the adhesive layer to be melted by means of exposure to laser radiation after it has dried, at any desired point in time, in order to carry out the jointing or bonding of the edge band to the material, provision is made—as described above—for the dispersion or solution of the adhesive polymer or the adhesive layer to comprise, furthermore, at least one laser radiation-absorbing additive.

In this connection it is preferred for the laser radiation-absorbing additive, more particularly pigment, to be of energy-absorbing and/or thermally conducting, more particularly reversibly energy-absorbing and thermally conducting, form. As already described above in connection with the laser activation, the laser radiation-absorbing additive is capable of absorbing the energy introduced by the laser irradiation and converting it into thermal energy. The resultant thermal energy is delivered, finally, to the surroundings—that is, directly to the adhesive layer—which, as a result, is heated to temperatures above its softening or melting point or melting range, and, by the melting, is placed into an adhesive or tacky state.

With regard to the laser radiation-absorbing additive specifically, it is preferred in accordance with the invention for said additive to consist of or comprise individual and/or discrete particles. In this case provision may be made in particular for the individual and/or discrete particles to have an average (particle) diameter, calculated as D50 value, in the range from 0.001 to 1 000 µm, more particularly 0.01 to 500 µm, preferably 0.05 to 200 µm, more preferably 0.1 to 150 µm, very preferably 0.2 to 100 µm.

Furthermore, it is possible, according to one particularly preferred embodiment of the present invention, for the laser radiation-absorbing additive, more particularly pigment, to be granular or particulate and preferably spherical.

With regard to the chemical properties of the laser radiation-absorbing additive, it is preferred in accordance with the invention for the laser radiation-absorbing additive, more particularly pigment, to be formed on an inorganic basis and/or mineral basis.

In this connection, provision may be made in accordance with the invention for the laser radiation-absorbing additive, more particularly pigment, to be formed on the basis of metals and inorganic metal compounds, more particularly metal oxides, metal hydroxides, metal silicates, metal aluminates, metal phosphates, metal sulphates and also combinations and mixtures thereof. Preferred metals here are, in particular, titanium, silicon, aluminium, tin, iron, copper and/or antimony and also combinations thereof.

Furthermore, provision make likewise be made in accordance with the invention for the laser radiation-absorbing additive to have a support. In this case it is preferred for the support to take the form of a preferably spherical core surrounded by an external coating or shell. Furthermore, provision may be made for the support to be fully or partly coated and/or for the support to have agglomerates, particularly on the surface of the support, and/or to be fully or partly coated therewith. In connection with laser radiation-absorbing additives which have a support, provision is usually made for the support to be formed on the basis of metals, inorganic metal compounds or organic polymers, more particularly metal oxides, metal hydroxides, metal silicates, metal aluminates, metal phosphates, metal sulphates and also combinations and mixtures thereof, preferably silicates, more particularly phyllosilicates, mica, magnesium silicates, aluminium silicates, alkali metal aluminium silicates, alkaline earth metal aluminium silicates and combinations thereof, silicon oxides, glass beads, hollow glass beads, nylon, polyacrylates, aluminium oxides and also combinations thereof. As far as the coating of such support materials is concerned, it is preferred in the context of the present invention for the (external) coating and/or shell and/or the agglomerates to be formed on the basis of inorganic oxides, hydroxides, sulphates, silicates, phosphates, aluminates, cyanoferrates and also mixtures and combinations thereof, preferably on the basis of titanium dioxide, silicon dioxide, tin oxide, iron oxide, copper hydroxide phosphate, copper phosphate, antimony oxide and also combinations and mixtures thereof.

Laser additives suitable for implementing the method of the invention are disclosed for example in publications DE 10 2010 004 743 A1 or WO 2011/085779 A1, DE 10 2009 051 171 A1 or US 2011/104220 A1, DE 10 2004 051 246 A1 or WO 2006/042623 A1 or US 2008/004363 A1, and also DE 10 2009 056 093 A1 or WO 2010/105735 A1 or US 2012/010345 A1, the relevant content of which is hereby incorporated in full by reference. Examples of commercially available laser additives suitable for the method of the invention are, for example, the products and laser additives sold by Merck KGaA, Darmstadt, Germany, more particularly from the Lazerflair® and Iriotec® ranges, more particularly Lazerflair® 820 and/or Iriotec® 8820.

As far as the amount of laser radiation-absorbing additive used is concerned, this amount too is variable. In the context of the present invention, provision is usually made for the dispersion or solution used in method step (a) to comprise the laser radiation-absorbing additive, more particularly pigment, in an amount in the range from 0.001 to 10 wt. %, more particularly in the range from 0.01 to 7.5 wt. %, preferably in the range from 0.01 to 5 wt. %, more preferably in the range from 0.05 to 4.5 wt. %, very preferably in the range from 0.1 to 4 wt. %, especially preferably in the range from 0.5 to 3.5 wt. %, based on the dispersion or solution.

In order to provide the edge bands with adhesive layers of particularly uniform thickness, provision may also be made, in the context of the present invention, for the dispersion or solution used in method step (a) to further comprise at least one film-forming assistant and/or at least one film former. In that case it is particularly preferred for the film-forming assistant or film former to be used in amounts in the range from 0.001 to 6 wt. %, more particularly in the range from 0.01 to 5 wt. %, preferably in the range from 0.01 to 4 wt. %, more preferably in the range from 0.05 to 3.5 wt. %, very preferably in the range from 0.1 to 3 wt. %, based on the dispersion or solution. The use of a film-forming assistant or film former makes it possible to achieve surface-covering filming of the surface of the edge tape with the dispersion or solution of the adhesive polymer. In this way a particularly stable and homogeneous adhesive bond is ensured, since the full surface of the edge band is covered with the adhesive dispersion. Suitable film formers and film-forming assistants for use in the dispersion and solutions are known per se to the skilled person; it is possible, for example, to use commercially available film formers, such as propylene carbonate or butyldiglycol acetate.

Furthermore, provision may be made in accordance with the invention for the dispersion or solution used in method step (a) to further comprise at least one other additive and/or at least one other auxiliary. The other additive or other auxiliary may be selected more particularly from the group of dispersing assistants, emulsifiers, fillers, defoamers, dyes, colourants, yellowing inhibitors, antioxidants, stabilizers, preservatives, UV absorbers, UV stabilizers, leveling agents, rheology modifiers, viscosity regulators, thickeners, pH modifiers, protective colloids and also mixtures and combinations thereof.

The use of the aforementioned additives or auxiliaries and also, optionally, of other customary additives not expressly mentioned at this point is known per se to the skilled person. The determination of the amounts that need to be used is also within the customary remit of the skilled person.

The dispersion or solution of the adhesive polymer is applied likewise by technical methods which are well known as such to the skilled person. Thus it is particularly preferred in the context of the present invention if in method step (a), to obtain a plastics layer which can be activated by means of laser radiation, the edge tape is furnished and/or provided with the dispersion or solution of the adhesive polymer by coating methods, more particularly by thermal, chemical, mechanical or thermomechanical coating, preferably by knife coating, rolling, spray application, jetting, injecting or plastifying.

Another of the features of the method of the invention is that only relatively small amounts of the adhesive polymer are needed for a stable adhesive bond. Accordingly, in the context of the method of the invention, provision is usually made for in method step (a) the dispersion or solution of the adhesive polymer to be applied at a rate of not more than 300 g/m$^2$, more particularly not more than 200 g/m$^2$, preferably not more than 150 g/m$^2$. In particular, provision may be made in method step (a) for the dispersion or solution of the adhesive polymer to be applied at a rate in the range from 1 to 300 g/m$^2$, more particularly in the range from 5 to 200 g/m$^2$, preferably in the range from 10 to 150 g/m$^2$. As already described above, the use of the dispersion or solution of the adhesive polymer at the aforementioned application rates is associated with numerous advantages. In particular, the swelling of the adhesive polymer out of the joint is prevented in this way. Moreover, the use of small quantities of adhesive also results in lower thicknesses on the part of the adhesive joint, thereby, in particular, enhancing the optical qualities, but also, furthermore, the durability of the resultant adhesive bond. Nevertheless, the aforementioned application rates are sufficient for reliable and stable bonding.

With regard specifically to the regime, provision may be made for method step (a) to be operated continuously, more particularly as a through-travel method, or else statically, preferably as a through-travel method.

In the context of the present invention, a through-travel method is understood more particularly to be a method for machine through-travel. In this case the edges, more particularly plastics edges, or edge bands are transported in a continuous flow, for example with a conveyor belt or running-belt installation, to the coating apparatus, where they are provided with the dispersion or solution of the adhesive polymer and, finally, leave the installation in a continuous flow of edge bands provided with the adhesive layer.

In contrast to this, a static method is carried out on a generally movable workstation. For this purpose, the edge bands are transported individually to the workstation, where they are coated or provided with the plastics layer or adhesive layer and subsequently are transported away again individually.

According to one preferred embodiment, method step (a) of the method of the invention is operated as a through-travel method, preferably in continuous operation.

The rate of advance with which method step (a) of the method of the invention is carried out can vary within wide ranges in the context of the present invention. Generally speaking, method step (a) is carried out as a through-travel method with a rate of advance of at least 1 m/min, more particularly at least 5 m/min, preferably at least 10 m/min, more preferably at least 15 m/min, very preferably at least 20 m/min. Provision may be made in particular for method step (a) to be carried out as a through-travel method with a rate of advance in the range from 1 to 100 m/min, more particularly in the range from 5 to 75 m/min, preferably in the range from 10 to 60 m/min, more preferably in the range from 15 to 50 m/min, very preferably in the range from 20 to 40 m/min.

Furthermore, in the context of the method of the invention, it is usual in method step (a), after the edge band has been furnished with the dispersion or solution of the adhesive polymer, for the dispersion medium or solvent to be removed. The removal of the solvent or dispersion medium takes place preferably by means of drying and/or evaporation at room temperature, more particularly at 25° C., or at elevated temperatures and/or under atmospheric pressure or reduced pressure. The intention in this way in particular is to obtain a non-tacky or tack-free plastics layer and/or adhesive layer which can nevertheless be adhesive bonded or activated by means of laser radiation. In this context, the terms "non-tacky" and "tack-free" refer to a state of the adhesive layer or plastics layer which foresees no adhesion or bonding taking place at room temperature (i.e. 25° C.) under atmospheric pressure; only after activation by means of laser radiation, in contrast, is the intention that the adhesive layer or plastics layer will develop its adhesion or tacky or adhesive qualities, allowing the mounting of the edge band onto the material. Advantageously there is no need for a release sheet to protect the adhesive layer.

The resulting dried or solvent-free plastics layer or adhesive layer has low thicknesses, furthermore, by comparison with the prior art. Accordingly, in the context of the present invention, provision is made more particularly for the plastics layer and/or adhesive layer which results from method step (a) and can be activated by means of laser radiation to have a thickness of not more than 200 µm, more particularly not more than 150 µm, preferably not more than 100 µm. In particular it is preferred in accordance with the invention for the plastics layer and/or adhesive layer which results from method step (a) and can be activated by means of laser radiation to have a thickness in the range from 0.1 to 200 µm, more particularly in the range from 0.5 to 150 µm, preferably in the range from 1 to 100 µm.

As the above thicknesses show, in the context of the present invention, an extremely small joint is realized for the resultant product, i.e. for the materials component furnished with an edge band. Besides the enhanced aesthetic aspects, an "invisible joint" of this kind is also substantially less susceptible to penetration by moisture and dirt, and so the bond and hence also the workpieces possess a very much greater lifetime.

As far, moreover, as the nature of the plastics layer or adhesive layer is concerned, provision is usually made for the plastics layer and/or adhesive layer which results from method step (a) and can be activated by means of laser radiation to comprise the laser radiation-absorbing additive, more particularly pigment, as an ingredient or integral constituent. It is particularly preferred in this context for the laser radiation-absorbing additive, more particularly pigment, to be distributed uniformly and/or homogeneously in the plastics layer and/or adhesive layer.

Uniform or homogeneous distribution of the laser radiation-absorbing additive means that in the adhesive layer or plastics layer the particles of the additive are distributed uniformly over the entire area of the plastics layer at regular intervals. This is associated in particular with the advantage that in the resultant product (i.e., materials component provided with edge band) particularly smooth adhesive edges are produced that are invisible to the naked eye, since particularly uniform adhesion to the material is achieved. Furthermore, via the uniform or homogeneous distribution of the laser-activatable additive, the absorption of energy and hence, ultimately, the heating can be particularly well controlled and deployed in a targeted way, with the consequence that, at least substantially, it is only the adhesive layer, but not the edge band per se, that becomes heated. Also, through the uniform and homogeneous distribution of the additive, complete adhesive bonding over the entire common area of coated edge band and materials component can be achieved. The uniform distribution of the laser-activatable additives results in particular from the application from dispersion or solution, and can be further reinforced in particular through the use of film formers.

Provision in accordance with the invention is made in particular for the plastics layer and/or adhesive layer to comprise the laser radiation-absorbing additive, more particularly pigment, in amounts in the range from 0.005 to 30 wt. %, more particularly in the range from 0.05 to 25 wt. %, preferably in the range from 0.1 to 20 wt. %, more preferably in the range from 0.5 to 15 wt. %, very preferably in the range from 1 to 10 wt. %, based on the plastics layer and/or adhesive layer. In this way, for the bonding of the edge or edge band, effective heat activation and hence a reliable adhesive bond is made possible.

In the context of the present invention, provision is usually made for the edge, more particularly the edge band, on the one hand, and the adhesive layer which can be activated by means of laser radiation, on the other hand, to be joined to one another durably and/or inseparably prior to the jointing operation, more particularly before mounting of the edge, more particularly plastics edge, onto the material. This takes place in the manner described above for method step (a), i.e. by dispersion application or solution application of the adhesive polymer, with subsequent removal of dispersion medium or solvent, respectively.

With regard to the further regime, it is preferred in the context of the method of the invention for in method step (b) the adhesive layer which results from method step (a) and can be activated by means of laser radiation to be heated on the edge band with exposure to laser radiation, more particularly being at least partly melted and/or converted into an adhesive or tacky state. In this context, provision may be made in particular for in method step (b) the exposure to laser radiation to bring about heating of the adhesive layer to temperatures in the range from 50 to 400° C., more particularly 70 to 300° C., preferably 100 to 250° C.

With regard to the input of energy onto the adhesive layer or plastics layer especially, it is preferred in accordance with the invention if in method step (b) the exposure to laser radiation is carried out by means of a laser source, more particularly a semiconductor laser, solid-state laser, fibre laser or $CO_2$ laser, preferably solid-state laser or semiconductor laser, more preferably Nd:YAG laser or diode laser.

In this context it has proved to be particularly advantageous if in method step (b) laser radiation having a wavelength in the range from 150 nm to 10.6 µm, more particularly 250 nm to 10.6 µm, preferably 300 nm to 10.6 µm, more preferably 500 nm to 10.6 µm, is used.

The energy density resulting from the exposure of the adhesive layer or plastics layer to laser radiation can also be varied within wide ranges. Thus it is usual in accordance with the invention for the exposure to laser radiation in method step (b) to produce an energy density in the range from 0.1 mJ/cm$^2$ to 50 J/cm$^2$, more particularly 0.2 mJ/cm$^2$ to 30 J/cm$^2$, preferably 0.3 mJ/cm$^2$ to 10 J/cm$^2$.

Finally, provision is usually made in the context of the method of the invention for the mounting of the edge, more particularly plastics edge, onto the material, more particularly the mounting of the edge band onto the narrow face of the in particular panel-like materials component, to take place by means of jointing, preferably with pressure and/or press application, more particularly in a through-travel method. This is a process which is known per se to the skilled person and which may take place in particular with use of pressure or press application means, such as rolls, rollers and the like, for example.

As described above, the method of the invention comprises the method steps (a) and (b) described in detail above. It is preferred here in accordance with the invention for the method steps (a) and (b) to be carried out separately or (spatially) apart from one another. It is particularly preferred in this context if an offline process is employed.

The regime described above is—as already mentioned above—advantageous in numerous respects. On account of the cost-effective production process and comparatively low cost and complexity of apparatus, the method of the invention allows economical production even of small batches or production runs and even when using polymers which can usually be processed only by means of coextrusion (i.e. polymers having high molecular weights and/or having low melt indices). Furthermore, the separate regime (i.e. the subsequent application of the adhesive layer or plastics layer to a pre-produced, i.e. ready-manufactured edge band) enables uncomplicated individual adaptation of the materials employed, which is important particularly with regard to the optical qualities, in order, for example, to realize different colourations of the decorations, but is also technically relevant in relation to the quality of the adhesive bond. Furthermore, the different manufacturing stages can be implemented by different companies specialized in the particular procedure, with the overall effect of significantly lowering the production costs, since each of the specialized companies is able to go on using its existing apparatus.

Alternatively, however, it is also possible for the method overall (i.e. the method steps (a) and (b)) to be operated as a continuous method, in particular as a through-travel method. This, however, is less preferred in the context of the present invention.

As is apparent from the above remarks, success has been achieved for the first time in the context of the present invention in providing a method for mounting an edge, more particularly plastics edge, onto a material, this method realizing an inexpensive, individually adaptable regime, more particularly an offline process, with nevertheless outstanding adhesive-bonding qualities, of the kind hitherto possible only through the use of cost-intensive and less individually adaptable coextrusion methods.

The present invention further provides—in accordance with a second aspect of the present invention—a material, more particularly a panel-like materials component (workpiece), wherein at least one narrow face (narrow side) of the material is provided with an edge band (edge strip) and wherein the material is obtainable by a method as described above.

The regime of the invention, indeed, is reflected directly in the end products as well, i.e. in the materials which are provided on at least one of their narrow faces with the edge band. The reason is that, on the one hand, a particularly thin adhesive layer, invisible to the naked eye, is produced as a joint—i.e. what is called an "invisible joint"—between materials component and edge band in the manner according to the invention. On the other hand, with a cost-effective aftercoating process, a quality of adhesive bond is achieved which in fact matches or even exceeds the quality of the adhesive bonds of coated edge bands produced by coextrusion. The amounts of adhesive and laser additive used as well, and also the homogeneity of their distribution, as a result of the application from dispersion or solution, distinguish the products of the invention from products of the prior art.

In particular the present invention, in accordance with this aspect of the invention, relates to a material, more particularly a panel-like materials component (workpiece), wherein at least one narrow face (narrow side) of the material is provided with an edge band (edge strip), wherein the edge band is applied to the narrow face by means of jointing and/or by means of adhesive bonding and is connected durably to it, wherein the edge band, before it is applied to the material, has been furnished and/or provided, on its side to be joined to the material, with an adhesive layer (plastics layer) which can be activated by means of laser radiation (laser-activatable layer), wherein the adhesive layer which can be activated by means of laser radiation is obtained starting from a dispersion or solution of at least one adhesive polymer to which at least one laser radiation-absorbing additive (laser additive), more particularly pigment, is added, and wherein the application and joining of the edge tape to the material have taken place with exposure to laser radiation and with pressure and/or press application.

For further details of the materials of the invention, reference may be made to the above remarks concerning the method of the invention, which apply correspondingly with regard to the materials of the invention.

Furthermore, the present invention—in accordance with a third aspect of the invention—relates to the use of a material of the invention, more particularly a panel-like materials component (workpiece), as described above, for producing furniture, more particularly kitchen parts, and furnishings of any kind and/or in the wood and furniture industry.

For further details of the inventive use, reference may be made to the above remarks concerning the above aspects of the invention, which apply correspondingly in relation to the inventive use.

Likewise provided for the present invention—in accordance with a fourth aspect of the invention—is a method for applying an adhesive layer (plastics layer) which can be activated by means of laser radiation (laser-activatable layer) to at least one side of an edge band (edge strip), more particularly for purposes of the subsequent mounting of the edge, more particularly plastics edge, onto a material by means of jointing and/or by means of adhesive bonding, wherein the edge band is furnished and/or provided, on at least one of its two sides, more particularly its side to be joined to a material, with an adhesive layer (plastics layer) which can be activated by means of laser radiation (laser-activatable layer), wherein the adhesive layer which is activatable by means of laser radiation is obtained starting from a dispersion or solution of at least one adhesive polymer to which at least one laser radiation-absorbing additive (laser additive), more particularly pigment, is added.

For further details of the method of the invention for applying an adhesive layer which can be activated by means of laser radiation to at least one side of an edge band, reference may be made to the above remarks concerning the above aspects of the invention, which apply correspondingly in relation to the aforementioned method.

Additionally provided with the present invention—in accordance with a fifth aspect of the present invention—is an edge band (edge strip or edge, more particularly plastics edge) which on at least one side has an adhesive layer (plastics layer) which can be activated by means of laser radiation (laser-activatable layer) and is obtainable by a method as described above in accordance with the fourth aspect of the invention.

Provided in particular for the present invention in accordance with this aspect of the invention is an edge band (edge strip or edge, more particularly plastics edge) which on at least one side is furnished and/or provided with an adhesive layer (plastics layer) which can be activated by means of laser radiation (laser-activatable layer), wherein the adhesive layer which can be activated by means of laser radiation is obtained starting from a dispersion or solution of at least one adhesive polymer to which at least one laser radiation-absorbing additive (laser additive), more particularly pigment, is added.

For further details of the edge bands of the invention in accordance with the fifth aspect of the invention, reference may be made to the above remarks concerning the above aspects of the invention, which apply correspondingly in relation to the edge bands of the invention.

Provided, moreover, with the present invention—in accordance with a sixth aspect of the present invention—is the use of a composition, more particularly in the form of a dispersion or solution, which comprises at least one one adhesive polymer and at least one laser radiation-absorbing additive (laser additive), more particularly pigment, for equipping and/or furnishing an edge band (edge strip) with an adhesive layer (plastics layer), more particularly for purposes of the mounting of the edge, more particularly plastics edge, onto a material by means of jointing and/or by means of adhesive bonding.

For further details of the inventive use, reference may be made to the above remarks concerning the above aspects of the invention, which apply correspondingly in relation to the inventive use.

Further embodiments, modifications and variations and also advantages of the present invention are readily apparent to the skilled person on reading the description and are realizable without him or her departing from the scope of the present invention.

The present invention is illustrated by the working examples below which in no way, however, restrict the present invention.

WORKING EXAMPLES

Described below are working examples of the present invention for the mounting of coated edge bands onto panel-like materials. In these examples, inventive embodiments have been compared with non-inventive embodiments, in particular with regard to DIN 204 (September 2001), DIN 205 (June 2003) and DIN EN 14257 (September 2006), especially in respect of durability classes D3 and D4.

Edge bands used for providing inventive and non-inventive embodiments were edge bands each with a width of 2.1 cm and a length of 3.5 m, which had been provided accordingly with an adhesive layer and, following laser activation, mounted onto narrow faces, 1.9 cm wide, of chipboard and MDF panels. Furnishing the edge bands with the solution or dispersion of the adhesive polymers was done by a form of application well known to the skilled person, using slot dies. The activation of the adhesive layer was carried out by exposure to laser radiation, with wavelengths customary in this respect, through the use of a diode laser. The jointing operation took place likewise by means of pressure or press application methods well known to the skilled person.

A total of five different experimental series were carried out, with inventive embodiments featuring (i) different amounts of the laser pigment, (ii) different amounts of the film former, (iii) different adhesive polymers, (iv) differently prepared surfaces of the edge band and also (v) non-inventive embodiments without laser pigment being compared with one another.

To assess the quality of the adhesive bonds between workpiece and edge band, the adhesion of edge band and workpiece was investigated first at room temperature (25° C.) and secondly, to analyse the low-temperature resistance, at +5° C. Furthermore, in an ascending heat test, the heat resistance was investigated at temperatures of up to 120° C. Furthermore, as part of a long-term heat test, an investigation took place over four months at 50° C. of the extent to which the adhesive bonds undergo changes in their properties under the sustained effect of high temperatures. Lastly, the adhesion of the adhesive bonds was investigated at room temperature after the long-term test.

The adhesion investigations (at room temperature, at +5° C. and after the end of the long-term heat test) were carried out by analysing the failure mode of the adhesive bond under load. For failure modes of adhesive bonds it is usual to distinguish between adhesive fracture, cohesive fracture within the adhesive, cohesive fracture within the adherend material, and boundary layer fractures.

An adhesive fracture is attributable to inadequate adhesion between adhesive layer and material, so that the adhesive separates completely from the material; adhesive fractures were not observed in any experimental series. In the case of boundary layer fractures, the fracture occurs directly at the phase boundary between adherend surface and adhesive layer; again, no such fractures were observed in any experimental series. Cohesive fractures within the adhesive take place in general when the internal strength of the adhesive is relatively low, and so, after fracture, the adherend surfaces (edge band and material) are covered with adhesive. Cohesive fractures within the material, in contrast, result when the internal strength of the adhesive is higher than that of the material used. The adhesive bond remains at least substantially unaffected by the mechanical load. Fractures of this kind are therefore considered to be an indicator of particularly stable adhesive bonds. In all of the experimental series, cohesive fractures within the adhesive or within the material, and also hybrid forms thereof, occur. The higher the proportion of the fractures within the material, therefore, the more stable the adhesive bond as well.

The evaluation was made in accordance with the following rating system:

| | | |
|---|---|---|
| 1-1.9: | "very good" | ≤100-90% fracture in material |
| 2-2.9: | "good" | ≤100-80% fracture in material |
| 3-3.9: | "satisfactory" | ≤80-60% fracture in material |
| 4: | "adequate" | ≤60-40% fracture in material |
| 5: | "deficient" | ≤40% fracture in material |
| 6: | "unsatisfactory" | ≥70% fracture in adhesives |

The heat resistances were analysed by investigating the appearance of visible changes in the adhesive bonds as a consequence of the severe and/or sustained thermal exposure ("n.v.c."=no visible changes).

(i) Effect of the Amount of Laser Pigment

In the first experimental series, entailing exclusively inventive embodiments, the effect of the weight-based amount of laser pigment used, relative to the dispersion or solution, on the stability of the adhesive bond was investigated. The results in this respect can be found in Table 1 below:

TABLE 1

Effect of the amount of laser pigment used on the adhesive bonds

| Fractions of laser | Example 1 | | Example 2 | | Example 3 | | Example 4 | |
|---|---|---|---|---|---|---|---|---|
| pigment [wt. %] | 0.05 | 0.05 | 1 | 1 | 2 | 2 | 10 | 10 |
| Material | MDF | Chipb. | MDF | Chipb. | MDF | Chipb. | MDF | Chipb. |
| Adhesion at RT | 2.3 | 2.4 | 1.9 | 2.0 | 1.8 | 2.0 | 2.1 | 2.1 |
| Adhesion at +5° C. | 2.6 | 2.8 | 1.9 | 2.1 | 1.9 | 2.0 | 2.4 | 2.5 |
| Ascending heat test to 120° C. | n.v.c. | n.v.c. | n.v.c. | n.v.c. | n.v.c. | n.v.c. | n.v.c. | n.v.c. |

TABLE 1-continued

Effect of the amount of laser pigment used on the adhesive bonds

| Fractions of laser | Example 1 | | Example 2 | | Example 3 | | Example 4 | |
|---|---|---|---|---|---|---|---|---|
| pigment [wt. %] | 0.05 | 0.05 | 1 | 1 | 2 | 2 | 10 | 10 |
| Long-term heat test | n.v.c. | n.v.c. | n.v.c. | n.v.c. | n.v.c. | n.v.c. | n.v.c. | n.v.c. |
| Adhesion at RT after long-term heat test | 2.4 | 2.4 | 2.0 | 2.0 | 2.1 | 2.0 | 2.1 | 2.2 |

The information above shows that with all of the tested concentrations of the laser pigment in the range from 0.05 wt. % to 10 wt. %, based in each case on the dispersion or solution, it is possible to produce stable adhesive bonds. The best results, however, were obtained with weight-based amounts in the range from 1 wt. % to 2 wt. %. When 0.05 wt. % of the laser pigment was used, there was a slight drop in the stability of the adhesive bond, but it was still identified overall as "good. When 10 wt. % of the laser pigment was used, it was indeed likewise possible to produce a stable adhesive bond; however, owing to the high solids content, it was extremely difficult to process the solution or dispersion of the adhesive polymer and to distribute it over the edge band, since it had a viscous consistency. Moreover, the optical properties of the resulting adhesive joint were adversely affected slightly by the use of large amounts of the laser additive, since the joint, as a consequence of the restricted distributability, exhibited slightly irregular thicknesses. Moreover, the use of larger amounts of the laser pigment is uneconomic.

(ii) Effect of the Use of Film Formers

In a second experimental series of inventive embodiments, furthermore, the effect of the additional use of film formers on the adhesive bond was investigated. The dispersions or solutions of the adhesive polymer that were used in this context contain 1.5 wt. % of the laser additive, based on the dispersion or solution, and also polyvinyl acetate as adhesive polymer. The film former used was propylene carbonate.

The results obtained in this respect are set out in Table 2 below:

TABLE 2

Effect of the film former on the quality of the adhesive bonds

| | Example 5 | | Example 6 | |
|---|---|---|---|---|
| Fractions of film former [wt. %] | 0.05 | 0.05 | 2 | 2 |
| Material | MDF | Chipb. | MDF | Chipb. |
| Adhesion at RT | 1.5 | 1.6 | 1.6 | 1.6 |
| Adhesion at +5° C. | 1.6 | 1.8 | 1.7 | 1.9 |
| Ascending heat test to 120° C. | n.v.c. | n.v.c. | n.v.c. | n.v.c. |
| Long-term heat test | n.v.c. | n.v.c. | n.v.c. | n.v.c. |
| Adhesion at RT after long-term heat test | 1.6 | 1.7 | 1.8 | 1.9 |

As can be seen from the results set out in Table 2, the quality of the adhesive bonds can be improved still further through the additional use of a film former. Without wishing to be tied here to this theory, the film former produces an even more uniform distribution of the solution or dispersion and hence also of the laser-activatable additives over the edge band. In this way an even more uniform heating and hence crosslinking of the adhesive polymers for curing can be achieved. Both when using 0.05 wt. % and when using 2.0 wt. % of the film former, based on the solution or dispersion, outstanding qualities were obtained on the part of the adhesive bonds.

(iii) Effect of the Selection of the Adhesive Polymer Used

In a third experimental series of inventive embodiments, the effect of each of the adhesive polymers used on the quality of the adhesive bonds was investigated. Here, in each case, the inventively preferred adhesive polymers (polyvinyl acetate, polyacrylate, polyurethanes, ethylene-vinyl acetate) were used as the adhesive polymer. Furthermore, the dispersions or solutions of the adhesive polymer contained the laser pigment in each case in a weight-based amount of 1.5 wt. %, based on the dispersion or solution.

The results obtained in this respect can be found in Table 3 below:

TABLE 3

Effect of the adhesive polymer on the quality of the adhesive bonds

| Adhesive polymer | Example 9 Polyvinyl acetate | | Example 10 Polyacrylate | | Example 11 Polyurethane | | Example 12 Ethylene-vinyl acetate | |
|---|---|---|---|---|---|---|---|---|
| Material | MDF | Chipb. | MDF | Chipb. | MDF | Chipb. | MDF | Chipb. |
| Adhesion at RT | 1.9 | 2.2 | 2.0 | 2.1 | 2.2 | 2.3 | 2.1 | 2.1 |
| Adhesion at +5° C. | 2.0 | 2.0 | 2.2 | 2.3 | 2.3 | 2.4 | 2.2 | 2.3 |
| Ascending heat test to 120° C. | n.v.c. | n.v.c. | n.v.c. | n.v.c. | n.v.c. | n.v.c. | n.v.c. | n.v.c. |
| Long-term heat test | n.v.c. | n.v.c. | n.v.c. | n.v.c. | n.v.c. | n.v.c. | n.v.c. | n.v.c. |
| Adhesion at RT after long-term heat test | 2.0 | 2.1 | 2.1 | 2.2 | 2.4 | 2.3 | 2.2 | 2.3 |

As the information above shows, with all of the polymers preferred in accordance with the invention it is possible to obtain good values in relation to the stability of the adhesive bonds. Consequently all of the adhesive polymers are equally suitable for producing stable adhesive bonds between material and edge band. The best results were obtained when using polyvinyl acetate.

(iv) Effect of the Surface Pretreatment

Finally, in a fourth experimental series, the effect of the preparation of the surface on the adhesive layer, in relation to the production of stable adhesive bonds, was investigated. In this comparative test, untreated edge bands, edge bands treated by means of corona treatment, and also edge bands coated with an adhesion promoter (primer) were employed. The subsequently applied solutions or dispersions of the adhesive polymer contained in each case 1.5 wt. % of the laser additive, relative to the solution or dispersion. The adhesive polymer used in each case was polyvinyl acetate.

The results obtained in this respect can be found in Table 4 below:

TABLE 4

Effect of the surface pretreatment on the adhesive bond

| Surface preparation | Example 13 No Pretreatment | | Example 14 Corona treatment | | Example 15 Adhesion promoter (primer) | |
| --- | --- | --- | --- | --- | --- | --- |
| Material | MDF | Chipb. | MDF | Chipb. | MDF | Chipb. |
| Adhesion at RT | 2.1 | 2.2 | 1.7 | 1.8 | 1.7 | 1.9 |
| Adhesion at +5° C. | 2.1 | 2.3 | 1.8 | 1.8 | 1.7 | 2.0 |
| Ascending heat test to 120° C. | n.v.c. | n.v.c. | n.v.c. | n.v.c. | n.v.c. | n.v.c. |
| Long-term heat test | n.v.c. | n.v.c. | n.v.c. | n.v.c. | n.v.c. | n.v.c. |
| Adhesion at RT after long-term heat test | 2.2 | 2.3 | 1.8 | 1.8 | 1.8 | 2.0 |

While outstanding adhesive bonds can be produced even without surface preparation, the quality and adhesion of edge band and adhesive layer and also, consequently, the quality of the adhesive bond can nevertheless be increased further by means of a pretreatment. In that case, outstanding values in respect of the stability of the adhesive bonds are achieved both when using corona treatment and when carrying out coating with adhesion promoter.

(v) Effect of the Presence of a Laser Pigment

In a last experimental series, for purposes of comparison, non-inventive embodiments were provided and were investigated for the quality of the adhesive bonds. In contrast to the inventive embodiments, the non-inventive embodiments contained no laser pigment in the dispersion or solution of the adhesive polymer. The adhesive polymers used were polyurethane, polyacrylate and ethylene-vinyl acetate.

Without the use of laser pigments it is not possible to produce stable adhesive bonds. While gluing of the edge band was found initially, after the laser treatment, stability was no longer found to be sufficient as soon as even slight pressure or low forces were exerted, of the kind that also occur in the course of customary treatment and further processing of such coated materials. Instead, the edge bands immediately detached themselves again, with breaking of the adhesive layer from the material. The problem of the unstable adhesive bonds occurred equally for all of the adhesive polymers used. Moreover, the adhesive bonds also parted on exposure to heat. It was not possible, accordingly, to subject the resulting materials to any further tests.

The use of the laser pigment is therefore essential for the production of stable adhesive bonds in the context of the inventive approach.

The remarks above show that in the context of the present invention, success has been achieved for the first time in providing a cost-effective aftercoating method for edge bands that allows the production of adhesive bonds stable not only at room temperature but also at low temperature and high temperature, such bonds being of the kind hitherto realizable only by means of the costly and less economic coextrusion.

The invention claimed is:

1. A method for mounting an edge band onto at least one narrow side of a workpiece in the form of a panel by means of adhesive bonding, wherein
    (a) first, the edge band is provided, on its side to be joined to the workpiece with an adhesive layer which can be activated by means of laser radiation, wherein the laser-activatable adhesive layer is obtained starting from a dispersion or solution of at least one adhesive polymer to which at least one laser radiation-absorbing additive is added,
        wherein the dispersion or solution of the adhesive polymer used in method step (a) for providing the edge band with a laser-activatable adhesive layer is formed on an aqueous basis or organic basis and comprises the adhesive polymer in an amount in the range from 5 to 90 wt. %, based on the dispersion or solution,
        wherein the adhesive polymer is selected from homopolymers and copolymers selected from the group consisting of (i) polyurethanes; (ii) polyacrylates and polymethacrylates; (iii) ethylene-vinyl acetates; (iv) polyvinyl acetates and also mixtures and combinations thereof, and has a weight-average molecular weight Mw in the range from 70,000 g/mol to 10,000,000 g/mol, and
        wherein the dispersion or solution further comprises at least one film-forming agent in an amount in the range from 0.001 to 6 wt. %, based on the dispersion or solution; and
    (b) thereafter, the edge band thus provided with the laser-activatable adhesive layer is mounted, with exposure to laser radiation, onto at least one narrow side of the workpiece, while being adhesively bonded durably to the at least one narrow side of the workpiece,
        wherein the edge band, before it is provided with the dispersion or solution of the adhesive polymer, is provided with an adhesion promoter or is subjected to a surface-activation.

2. The method according to claim 1,
    wherein the edge band comprises a thermoplastic or thermoset material selected from the group consisting of (i) polyolefins; (ii) polymethacrylates (PMA); (iii) polymethylmethacrylates (PMMA); (iv) polyvinyl chloride (PVC); (v) polyvinylidene halides; (vi) acrylonitrile/butadiene/styrene copolymers (ABS); (vii) polyamides (PA); (viii) polycarbonates (PC); (ix) melamine-formaldehyde resins; (x) epoxy resins; (xi) phenolic resins; and (xii) urea resins; and
    wherein the workpiece material used is selected among wood, wood substitutes, plastics, metals or glass.

3. The method according to claim 1,
    wherein the adhesive polymer, at a temperature of 190° C. and under a load of 2.16 kg, has a melt index determined in accordance with ISO 1133, in the range from 0.01 g/10 min to 50 g/10 min.

4. The method according to claim 1,
wherein the laser radiation-absorbing additive comprises discrete particles having an average particle diameter, calculated as D50 value, in the range from 0.001 to 1 000 µm; and wherein the laser radiation-absorbing additive is formed on an inorganic basis.

5. The method according to claim 1,
wherein the laser radiation-absorbing additive is selected from the group consisting of metal oxides, metal hydroxides, metal silicates, metal aluminates, metal phosphates, metal sulphates and also combinations and mixtures thereof.

6. The method according to claim 1,
wherein the laser radiation-absorbing additive is of spherical form.

7. The method according to claim 1,
wherein the dispersion or solution used in method step (a) comprises the laser radiation-absorbing additive in an amount in the range from 0.001 to 10 wt. %, based on the dispersion or solution.

8. The method according to claim 1,
wherein in method step (a), the edge band is provided with the dispersion or solution of the adhesive polymer by coating methods; and
wherein in method step (a), the dispersion or solution of the adhesive polymer is applied at a rate in the range from 1 to 300 g/m$^2$.

9. The method according to claim 1,
wherein in method step (a), after the edge band has been provided with the dispersion or solution of the adhesive polymer, the dispersion medium or solvent is removed, thus obtaining a non-tacky or tack-free adhesive layer which can be adhesive bonded and activated by means of laser radiation.

10. The method according to claim 1,
wherein the laser-activatable adhesive layer resulting from method step (a) has a thickness in the range from 0.1 to 200 µm; and
wherein the laser-activatable adhesive layer resulting from method step (a) comprises the laser radiation-absorbing additive, in homogeneous distribution over the overall adhesive layer, in an amount in the range from 0.005 to 30 wt. %, based on the adhesive layer.

11. The method according to claim 1,
wherein in method step (b), the laser-activatable adhesive layer resulting from method step (a) is heated with exposure to laser radiation on the edge band, so that it is at least partly converted into a tacky state, wherein the exposure to laser radiation brings about the heating of the adhesive layer to temperatures in the range from 50 to 400° C. and wherein the exposure to laser radiation is carried out by means of a laser source selected from the group consisting of semiconductor lasers, solid-state lasers, fibre lasers and $CO_2$ laser and producing laser radiation having a wavelength in the range from 150 nm to 10.6 µm and producing an energy density in the range from 0.1 mJ/cm$^2$ to 50 J/cm$^2$.

* * * * *